United States Patent [19]
Harris et al.

[11] Patent Number: 6,051,129
[45] Date of Patent: Apr. 18, 2000

[54] PROCESS FOR REDUCING HAZE POINT IN BRIGHT STOCK

[75] Inventors: Thomas V. Harris, Benicia; R. Norm Reynolds, Jr., Point Richmond; Roger F. Vogel, Fairfield; Donald S. Santilli, Larkspur, all of Calif.

[73] Assignee: Chevron U.S.A. Inc., San Francisco, Calif.

[21] Appl. No.: 09/122,542

[22] Filed: Jul. 24, 1998

[51] Int. Cl.⁷ .................................................. C10G 73/38
[52] U.S. Cl. ..................... 208/138; 208/135; 208/137; 208/58; 208/60; 208/27; 585/739
[58] Field of Search ............... 208/58, 60, 135, 208/137, 138, 27; 585/739

[56] References Cited

U.S. PATENT DOCUMENTS

| | | | |
|---|---|---|---|
| 3,700,585 | 10/1972 | Chen et al. | 208/111 |
| 3,894,938 | 7/1975 | Gorring et al. | 208/97 |
| 4,176,050 | 11/1979 | Chen et al. | 208/111 |
| 4,181,598 | 1/1980 | Gillespie et al. | 208/58 |
| 4,222,855 | 9/1980 | Pelrine et al. | 208/111 |
| 4,229,282 | 10/1980 | Peters et al. | 208/111 |
| 4,247,388 | 1/1981 | Banta et al. | 208/111 |
| 4,397,827 | 8/1983 | Chu | 423/326 |
| 4,437,976 | 3/1984 | Oleck et al. | 208/97 |
| 4,537,754 | 8/1985 | Casci et al. | 423/277 |
| 4,575,416 | 3/1986 | Chester et al. | 208/111 |
| 4,593,138 | 6/1986 | Casci et al. | 585/481 |
| 4,910,006 | 3/1990 | Zones et al. | 423/328 |
| 4,921,594 | 5/1990 | Miller | 208/58 |
| 5,053,373 | 10/1991 | Zones | 502/64 |
| 5,149,421 | 9/1992 | Miller | 208/114 |
| 5,300,210 | 4/1994 | Zones et al. | 208/46 |
| 5,316,753 | 5/1994 | Nakagawa | 423/706 |
| 5,591,322 | 1/1997 | Zones et al. | 208/120 |

FOREIGN PATENT DOCUMENTS 0 225 053 B1  8/1992  European Pat. Off. .

*Primary Examiner*—Walter D. Griffin
*Attorney, Agent, or Firm*—Timothy J. Hadlock; Ernest A. Schaal

[57] ABSTRACT

A dewaxing process for lowering the haze point of a bright stock which includes contacting a bright stock in the presence of added hydrogen gas with a Zeolite EU-1 catalyst in combination with a ZSM-48 and/or SSZ-32 catalyst.

34 Claims, 5 Drawing Sheets

PROCESS FOR REDUCING HAZE POINT IN BRIGHT STOCK

I. FIELD OF THE INVENTION

The present invention relates to a process for catalytically dewaxing lube oils. More specifically, the invention relates to a process for reducing the haze point of a bright stock.

II. BACKGROUND OF THE INVENTION

Certain processes for dewaxing petroleum distillates are well known. Dewaxing is required when highly paraffinic oils are to be used in products which must be mobile at low temperatures, e.g., lubricating oils, heating oils, and jet fuels. The higher molecular weight straight chain normal, substituted and slightly branched paraffins present in such oils are waxes that cause high pour points and high cloud points and haze points in the oils. If adequately low pour points are to be obtained, the waxes must be wholly or partially removed. In the past, various solvent removal techniques were employed to remove such waxes, such as propane dewaxing and MEK dewaxing; however, these have high operating costs, significant environmental impacts and produce oils which are inferior to catalytically-dewaxed oils. Catalytic dewaxing processes are more economical and remove the waxes by selectively isomerizing and cracking paraffinic components to produce lower molecular weight products, some of which may be removed by distillation.

Because of their selectivity, known dewaxing catalysts generally comprise an aluminosilicate zeolite having a pore size which admits the straight chain n-paraffins either alone or with only slightly branched chain paraffins, but which excludes more highly branched materials, larger cycloaliphatics and aromatics. Zeolites such as ZSM-5, ZSM-11, ZSM-12, ZSM-23, ZSM-35 and ZSM-38 have been proposed for this purpose in dewaxing processes. Their use is described in U.S. Pat. Nos. 3,700,585; 3,894,938; 4,176,050; 4,181,598; 4,222,855; 4,229,282 and 4,247,388, the disclosures of which are incorporated herein by reference.

Since dewaxing processes of this kind function by means of cracking reactions, a number of useful products become degraded to lower molecular weight materials. For example, waxy paraffins may be cracked down to butane, propane, ethane and methane and so may the lighter n-paraffins which do not contribute to the waxy nature of the oil. Because these lighter products are generally of lower value than the higher molecular weight materials, it is desirable to limit the degree of cracking which takes place during a catalytic dewaxing process.

European Patent Application No. 225,053 discloses a process for producing lubricant oils by partially dewaxing a lubricant base stock by isomerization dewaxing followed by a selective dewaxing step. The isomerization dewaxing step is carried out using a large pore, high silica zeolite dewaxing catalyst such as high silica Y or zeolite beta which isomerizes the waxy components of the base stock to less waxy branched chain isoparaffins. The selective dewaxing step may be either a solvent, e.g., MEK dewaxing operation or a catalytic dewaxing, preferably using a highly shape zeolite such as ZSM-22 or ZSM-23.

U.S. Pat. No. 4,437,976 discloses a two-stage hydrocarbon dewaxing hydrotreating process wherein the pour point of a hydrocarbon charge stock boiling from 400° F. to 1050° F. is reduced by catalytically dewaxing the charge stock in the presence of a zeolite catalyst and subsequently subjecting at least the liquid portion thereof to hydrogenation in the presence of a hydrotreating catalyst comprising a hydrogenating component and a siliceous porous crystalline material from the class of ZSM-5, ZSM-11, ZSM-23 and ZSM-35 zeolites.

U.S. Pat. No. 4,575,416 to Chester et al. discloses a hydrodewaxing process with a first zeolitic catalyst having a Constraint Index not less than 1, a second catalytic component of specified characteristics and a hydrogenation component.

U.S. Pat. No. 5,149,421 teaches a dewaxing catalyst which provides superior selectivity with respect to the nature of the products obtained in a dewaxing process. By using an intermediate pore size silicoaluminophosphate molecular sieve catalyst in the dewaxing process, hydrocarbon oil feedstocks are effectively dewaxed and the products obtained are of higher molecular weight than those obtained using the other aluminosilicate zeolites. The products obtained from the dewaxing process have better viscosities and viscosity indexes at a given pour point as compared to the above-described prior art process using aluminosilicate zeolites.

Bright Stock, a lubricating oil base stock with a high boiling point (mostly >1000° F.), is difficult to dewax; a wax haze tends to remain while dewaxing a bright stock to the target pour point. This residual haze is indicated by a large spread between the haze point and the pour point of the dewaxed oil. A haze-pour point spread of less than 10–25° C. is generally observed for most lube oils (with the haze point being higher than the pour point and higher than the cloud point). It is desirable to have the haze point be less than 10° F. higher than the pour point. When dewaxing bright stock, pour-haze spreads of greater than 20° C. are often encountered, at least in pilot plant work. Increasing dewaxing severity to reduce the haze-pour spread results in reduced yields, and often the haze point cannot be reduced enough, regardless of how low the pour point is reduced. It is desirable to identify a catalyst system which removes the wax haze during dewaxing to the target pour point (less than −9° C. usually).

It would be advantageous to have an improved process for dewaxing and reducing the haze point of bright stocks. The present invention provides such a process.

III. SUMMARY OF THE INVENTION

The present invention overcomes the problems and disadvantages of the prior art by providing a process for catalytically dewaxing a hydrocarbon oil feedstock which produces a superior lube oil yield. We have now discovered several catalyst compositions which dewax bright stock to the target pour point with good yield, while also reducing the haze point to generally low levels.

These materials can be used alone or in conjunction with any conventional dewaxing catalyst to produce bright stock with satisfactorily low haze points. These catalysts reduce the haze-pour point spread with very little reduction in dewaxed oil yield.

The invention is in one embodiment a process for reducing haze point including contacting a bright stock hydrocarbon feedstock under dewaxing conditions with a catalyst system including Zeolite EU-1 and a catalyst selected from the group consisting of ZSM48, SSZ-32, and mixtures thereof.

IV. BRIEF DESCRIPTION OF THE DRAWINGS

V. DETAILED DESCRIPTION OF PREFERRED EMBODIMENTS

A. Steps of the Process

Figure 1:
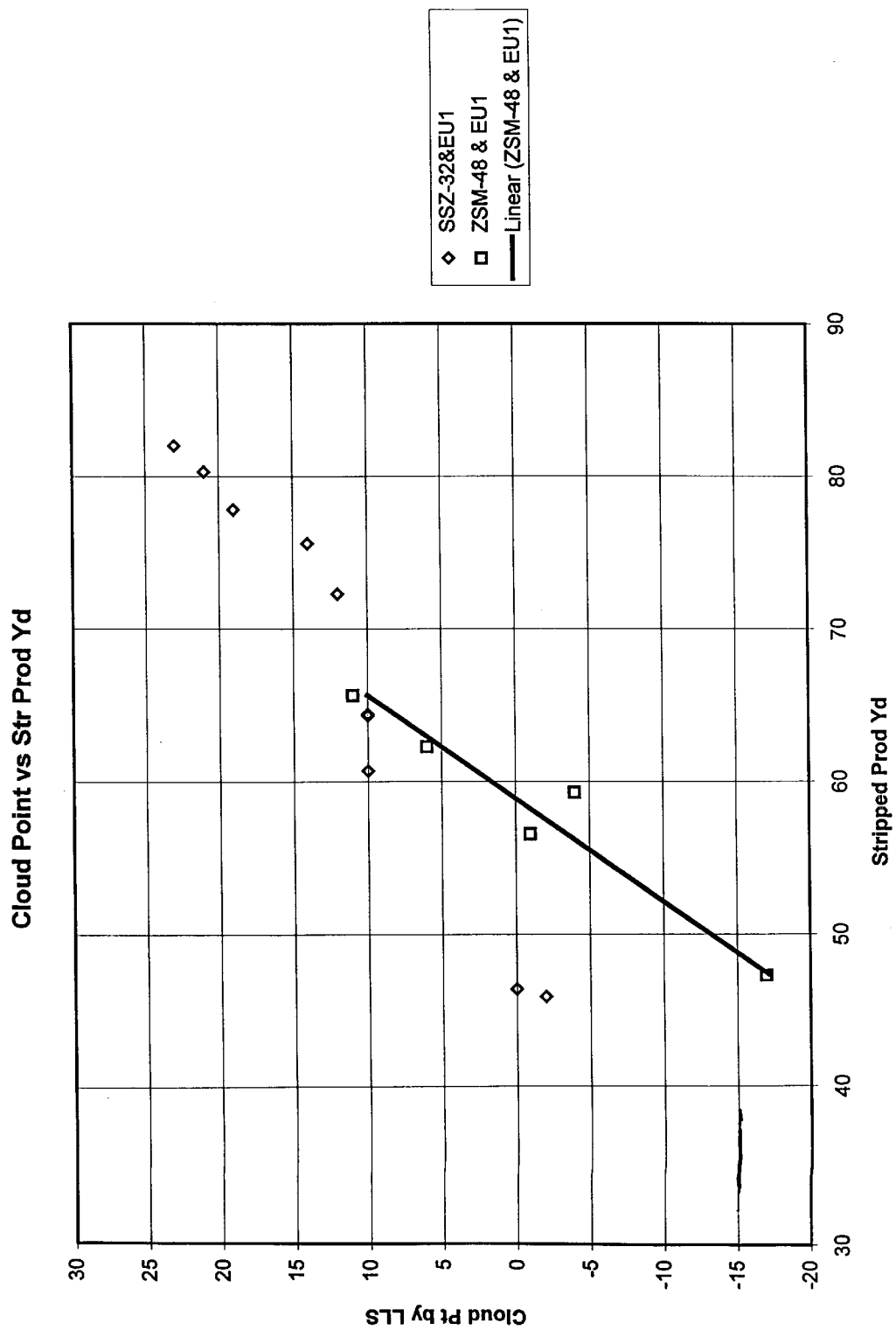
FIG. 1 depicts experimental results in one embodiment of the invention: a graph of cloud point versus stripped product yield.
Figure 2:
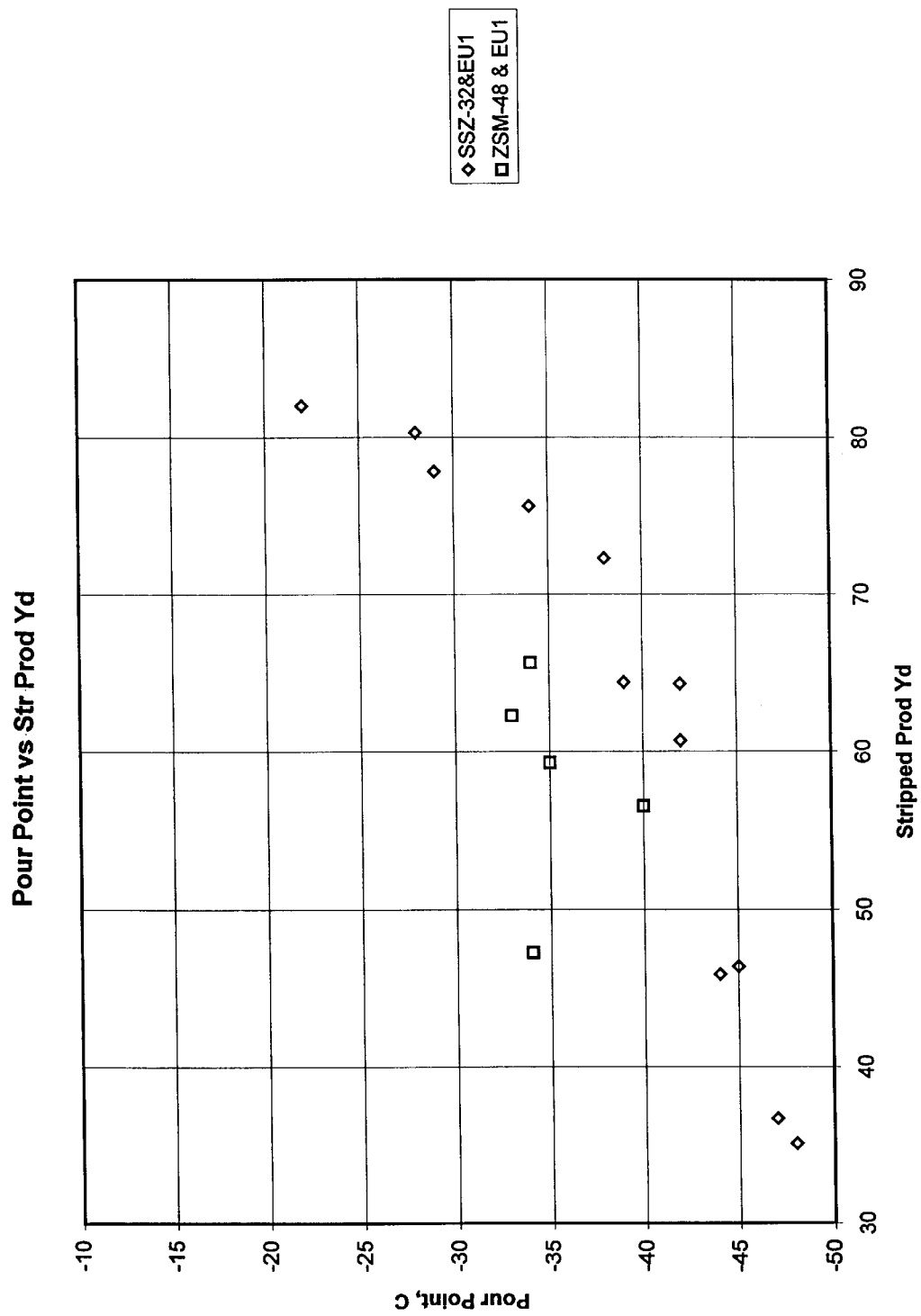
FIG. 2 depicts experimental results in one embodiment of the invention: a graph of pour point versus stripped product yield.
Figure 3:
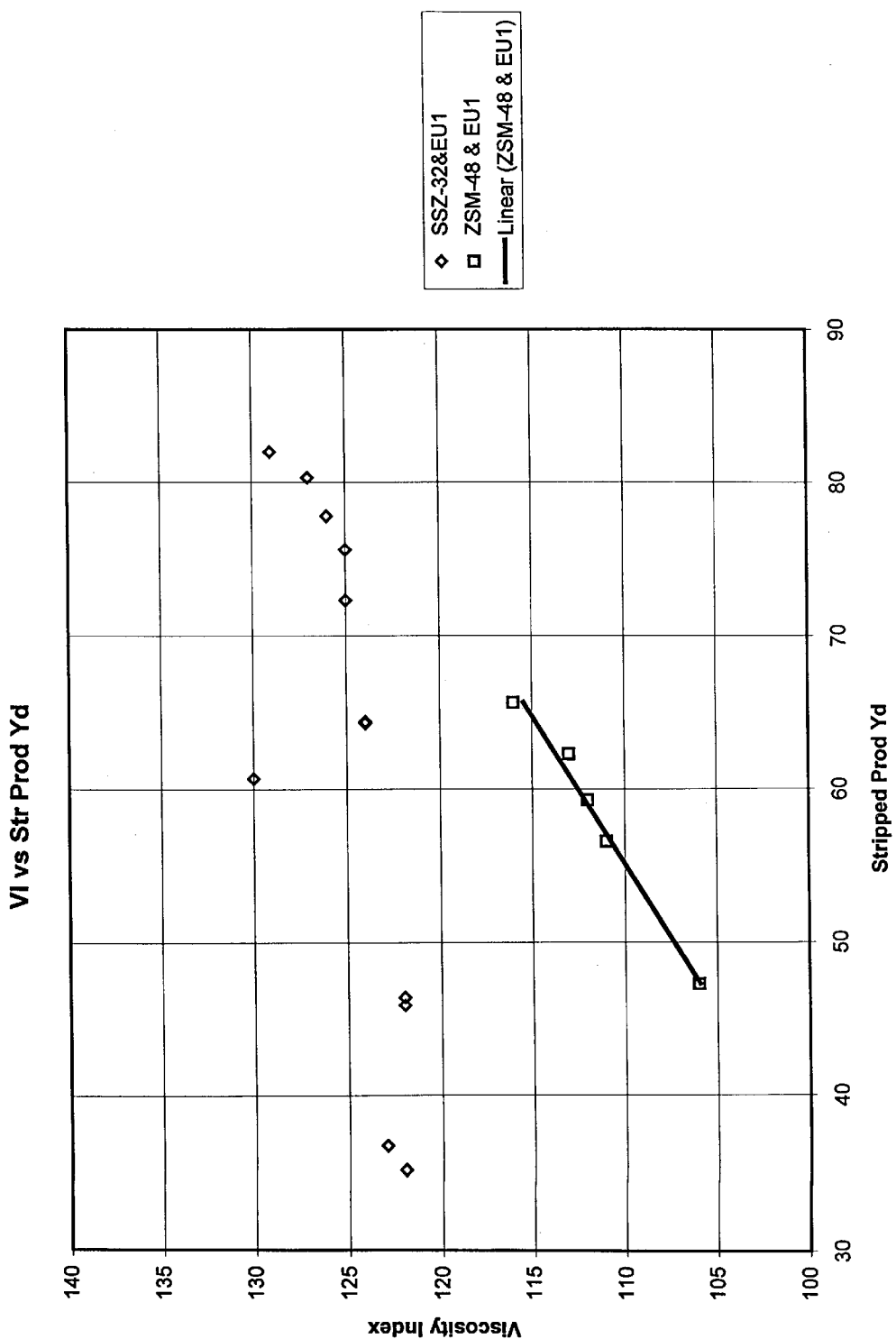
FIG. 3 depicts, in one embodiment of the invention, a graph of Viscosity Index versus stripped product yield.
Figure 4:
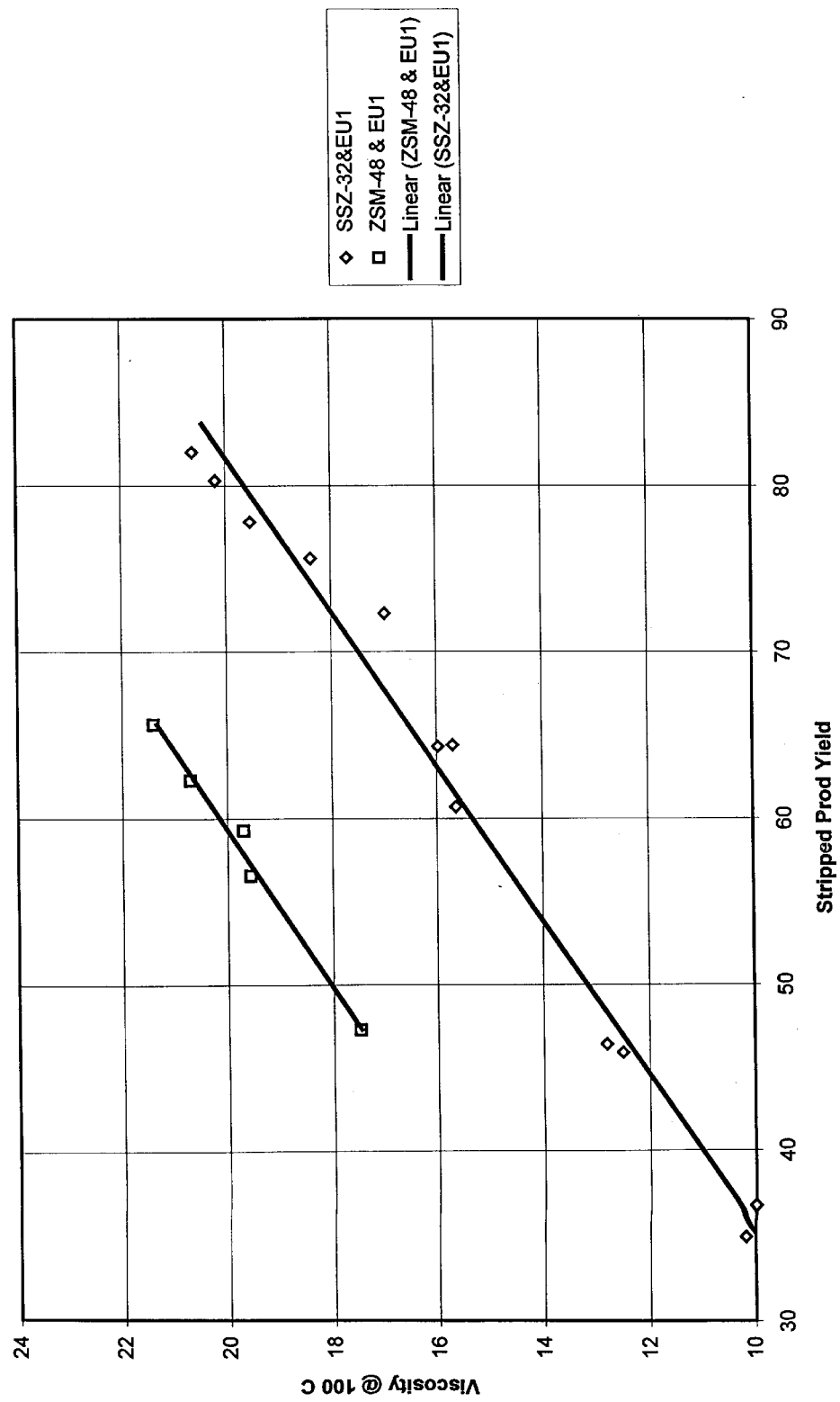
FIG. 4 depicts experimental results in one embodiment of the invention: a graph of product viscosity at 100° C. versus stripped product yield.
Figure 5:
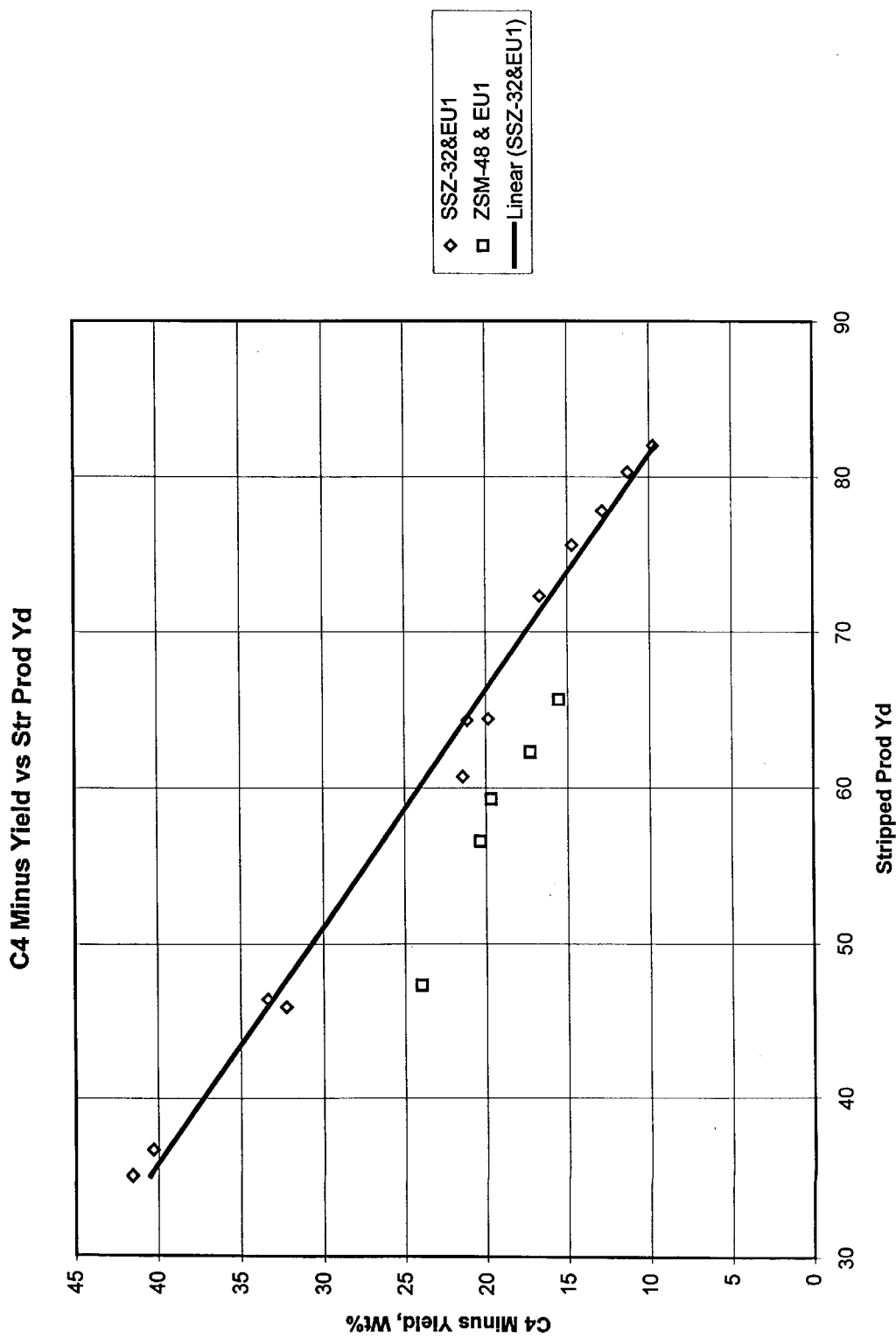
FIG. 5 depicts experimental results in one embodiment of the invention: a graph of yield of $C_4$– versus stripped product yield.

The steps of the process are contacting a bright stock hydrocarbon feedstock under dewaxing conditions with a Zeolite EU-1 catalyst in combination with a ZSM-48 and/or SSZ-32 catalyst.

The catalyst system optionally further includes a catalyst selected from the group consisting of an intermediate pore size silicoaluminophosphate molecular sieve, an amorphous catalyst, and mixtures thereof. For pre-treatments, the feed may be hydrocracked or solvent extracted and hydrotreated. This type of two-stage process and typical hydrocracking conditions are described in U.S. Pat. No. 4,921,594, issued May 1, 1990 to Miller, which is incorporated herein by reference in its entirety. Post-treatments can include hydrofinishing, discussed below.

Without being limited by theory, in one embodiment, the dewaxing mechanism is isomerization and/or cracking of waxy compounds. Typically, catalytic dewaxing, e.g., Chevron's ISODEWAXING catalytic dewaxing process, operates to improve the pour point and viscosity index of a feedstock, compared to solvent dewaxing.

B. Feedstock

The process of the invention is for dewaxing a bright stock. The term "bright stock" means a lubricating oil hydrocarbon feedstock which has a major portion boiling over 1000° F. The term "major portion" means at least 50 weight percent. The term "minor portion" means less than 50 weight percent. The minor portion, optionally, has a boiling point less than 1000° F.

The feedstock, optionally, can include a variety of hydrocarbon oil feedstocks classified generally as any waxy hydrocarbon feed, lube oil feedstock, or middle distillate oil. The minor portion of the feedstocks include distillate fractions, e.g., hydrocrackates, up to high boiling stocks such as deasphalted and solvent extracted oils. The minor portion of the feedstock will normally be a $C_{10}$+ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.).

Hydroprocessed stocks are a convenient source of stocks of this kind and also of other distillate fractions since they have a higher hydrogen content over solvent-processed stocks and are usually relatively free of heteroatoms (e.g., sulfur and nitrogen compounds) which can impair the performance of the dewaxing and hydrofinishing catalysts. The minor portion of the feedstock of the present process will normally be a $C_{10}$+ feedstock containing paraffins, olefins, naphthenes, aromatics and heterocyclic compounds and a substantial proportion of higher molecular weight n-paraffins and slightly branched and substituted paraffins which contribute to the waxy nature of the feedstock.

During processing, feed molecules undergo some cracking or hydrocracking to form liquid range materials which contribute to a low viscosity product. The degree of cracking which occurs is, however, limited to preserve the yield of the valuable liquids.

During processing, the n-paraffins and slightly branched paraffins undergo some cracking or hydrocracking to form liquid range materials which contribute to a low viscosity product. The degree of cracking which occurs is, however, limited so that the gas yield is reduced, thus preserving the economic value of the feedstock. Typical feedstocks include light gas oils, heavy gas oils and reduced crudes boiling above 350° F. In one embodiment, the feedstock contains a major portion of a hydrocarbon oil feedstock boiling above about 350° F. and contains straight chain and slightly branched chain hydrocarbons. In one embodiment, the hydrocarbon oil feedstock includes a $C_{20}$+ olefin feed and the process is a process for producing a $C_{20}$+ lube oil from said $C_{20}$+ olefin feed including isomerizing the olefin feed under isomerization conditions over the catalyst.

While the process of the invention can be practiced with utility when the feed contains organic nitrogen (nitrogen-containing impurities), it is preferred that the organic nitrogen content of the feed be less than 50 ppmw, more preferably less than 10 ppmw. Particularly good results, in terms of activity and length of catalyst cycle (period between successive regenerations or startup and first regeneration), are experienced when the feed contains less than 10 ppmw of organic nitrogen.

C. Zeolite

Suitable aluminosilicate zeolite catalysts for use in the process of the invention include ZSM-48, SSZ-32, and mixtures thereof in combination with a Zeolite EU-1. These are taught in R. Szostak, *Handbook of Molecular Sieves* (Van Nostrand Reinhold 1992), at pages 551–553 and 172–174, which are incorporated herein by reference, and in U.S. Pat. Nos. 5,053,373; 4,397,827; 4,537,754; and 4,593,138, the disclosures of which are incorporated herein by reference. Where two or more zeolite catalysts are employed, they are mixed in an effective weight ratio to enhance dewaxing. Preferred ratios for two zeolites are from about 1:5 to about 20:1.

Any zeolite used in the process may optionally contain a hydrogenation component of the type commonly employed in dewaxing catalysts. See the aforementioned U.S. Pat. No. 4,910,006 and U.S. Pat. No. 5,316,753 for examples of these hydrogenation components, the disclosures of which are incorporated herein by reference.

The hydrogenation component is present in an effective amount to provide an effective hydrodewaxing and hydroisomerization catalyst preferably in the range of from about 0.01 to 10% by weight, more preferably from about 0.05 to 5% by weight. The catalyst system may be run in such a mode to increase isodewaxing at the expense of cracking reactions.

Any two or more zeolites utilized in this process may be utilized as a dewaxing catalyst system in the form of a layered catalyst. That is, the catalyst system comprises a first layer comprising, e.g., zeolite SSZ-32, and at least one Group VIII metal, and a second layer comprising another aluminosilicate zeolite, e.g., one which is more shape selective than zeolite SSZ-32. The use of layered catalysts is disclosed in U.S. Pat. No. 5,149,421, issued Sep. 22, 1992 to Miller, which is incorporated by reference herein in its entirety. The layering may also include a zeolite bed, e.g., SSZ-31, SSZ-32, SSZ-41, SSZ-43, ZSM-5, ZSM-12, SAPO-11, SAPO-31, SAPO-40, SAPO-41, UTD-1, layered with a non-zeolitic component designed for either hydrocracking or hydrofinishing, or any other catalyst having isodewaxing activity with bright stocks. Intimately mixed catalyst systems represent another useful variant on this concept.

The aluminosilicate zeolite catalyst preferably contains a Group VIII metal, such as platinum, palladium, molybdenum, nickel, vanadium, cobalt, tungsten, zinc, and mixtures thereof. More preferably, the intermediate pore size aluminosilicate zeolite catalyst contains at least one Group VIII metal selected from the group consisting of platinum and palladium. Most preferably, the intermediate pore size aluminosilicate zeolite catalyst contains platinum.

The amount of metal ranges from about 0.01% to about 10% by weight of the molecular sieve, preferably from about 0.2% to about 5%, based on the weight of the molecular sieve. The techniques of introducing catalytically active metals to a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485, the disclosures of which are incorporated herein by reference.

D. Amorphous Catalysts/Binders

Catalysts useful in this invention typically comprise an active material and a support or binder. The support for the catalysts of this invention may be the same as the active material and further can be a synthetic or naturally occurring substance as well as an inorganic material such as clay, silica and/or one or more metal oxides. The latter may be either naturally occurring or in the form of gelatinous precipitates or gels including mixtures of silica and metal oxides.

Naturally occurring clays which can be used as support for the catalysts include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification. In addition to the foregoing materials, the catalysts used in the process of this invention may be supported on a porous binder or matrix material, such as titania, zirconia, silica-magnesia, silica-zirconia, silica-thoria, silica-berylia, silica-titania, titania-zirconia, as well as a ternary compound such as silica-magnesia-zirconia. A mixture of these components could also be used.

The support may be in the form of a cogel. One binder that is suitable is a low acidity titania prepared from a mixture comprising a low acidity titanium oxide binder material and an aqueous slurry of titanium oxide hydrate. Other binders include alumina and alumina-containing materials such as silica-alumina, silica-alumina-thoria, silica-alumina-zirconia, and silica-alumina-magnesia. Typical aluminas include alpha (alpha) alumina, beta (beta) alumina, gamma (gamma) alumina, chi-eta-rho (chi, eta, rho) alumina, delta (delta) alumina, theta (theta) alumina, and lanthanum beta (beta) alumina. The preferred support is one that is a high surface area material that also possesses a high temperature stability and further possesses a high oxidation stability.

The binder may be prepared according to U.S. Pat. No. 5,430,000, incorporated by reference herein, or may be prepared according to methods disclosed in U.S. Pat. Nos. 4,631,267; 4,631,268; 4,637,995; and 4,657,880, each incorporated by reference herein. Also, the catalysts described herein may be combined with any of the binder precursors described in the above patents, and then may be formed, such as by extrusion, into the shape desired, and then finished in a humidified atmosphere as hereinafter described.

E. Process Conditions

The process is conducted at catalytic dewaxing conditions. Such conditions are known and are taught for example in U.S. Pat. Nos. 5,591,322; 5,149,421; and 4,181,598, the disclosures of which are incorporated herein by reference. The catalytic dewaxing conditions are dependent in large measure on the feed used and upon the desired pour point. Hydrogen is preferably present in the reaction zone during the catalytic dewaxing process. The hydrogen to feed ratio, i.e., hydrogen circulation rate, is typically between about 500 and about 30,000 SCF/bbl (standard cubic feet per barrel), preferably about 1000 to about 20,000 SCF/bbl. Generally, hydrogen will be separated from the product and recycled to the reaction zone.

Catalyst bed arrangements suitable for use in the process of the invention are any conventional catalyst bed configuration. The catalytic dewaxing conditions employed depend on the feed used and the desired pour point.

Generally, the process conditions for dewaxing processes are as follows: the temperature is from about 200° C. and about 475° C., preferably between about 250° C. and about 450° C. The pressure is typically from about 15 psig and about 3000 psig, preferably between about 200 psig and 3000 psig. The liquid hourly space velocity (LHSV) preferably will be from 0.1 to 20, preferably between about 0.2 and 10.

Hydrogen is preferably present in the reaction zone during the catalytic isomerization process. The hydrogen to feed ratio is typically between about 500 and about 30,000 SCF/bbl (standard cubic feet per barrel), preferably from about 1000 to about 20,000 SCF/bbl. Generally, hydrogen will be separated from the product and recycled to the reaction zone.

F. Post-Treatments

It is often desirable to use mild hydrogenation (sometimes referred to as hydrofinishing). The hydrofinishing step is beneficial in preparing an acceptably stable product (e.g., a lubricating oil) since unsaturated products tend to be unstable to air and light and tend to degrade. The hydrofinishing step can be performed after the isomerization step. Hydrofinishing is typically conducted at temperatures ranging from about 190° C. to about 340° C., at pressures of from about 400 psig to about 3000 psig, at space velocities (LHSV) of from about 0.1 to about 20, and hydrogen recycle rates of from about 400 to about 15,000 SCF/bbl.

The hydrogenation catalyst employed must be active enough not only to hydrogenate the olefins and diolefins within the lube oil fractions, but also to reduce the content of any aromatics (color bodies) present.

Suitable hydrogenation catalysts include conventional, metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites and other molecular sieves. Palladium, platinum, and mixtures thereof are particularly preferred hydrogenation metals. If desired, non-noble Group VIII metals can be used with molybdates or tungstates. Metal oxides, e.g., nickel/cobalt promoters, or sulfides can be used. Suitable catalysts are disclosed in U.S. Pat. Nos. 3,852,207; 4,157,294; 4,921,594; 3,904,513 and 4,673,487, the disclosures of which are incorporated herein by reference.

G. Haze Point

As a result of the contacting between the feed and the catalyst system at dewaxing conditions, the haze point of the hydrocarbon feedstock is reduced when compared to the haze point of the non-dewaxed hydrocarbon feedstock. Preferably, the haze point of the dewaxed hydrocarbon feedstock is reduced to not more than 15° C., more preferably to not higher than 10° C., and most preferably the haze point of said hydrocarbon feedstock is reduced to at least 5° C. In one embodiment, the haze point is reduced to below 0° C.

It is important to note the distinction between the terms "cloud point" and "haze point" as used in this specification. Both cloud point and haze point are measured with same analytical equipment which, in brief, passes a light beam through a sample as the temperature of the sample is lowered. The amount of "light scattering" is measured. As compounds crystallize or otherwise precipitate out, light scattering increases. The amount of increase is compared to the base line measurement taken at ambient temperature.

The difference between cloud and haze points, as used in this specification, is the severity and rate of increase in light scattering which must occur before a cloud point or haze point is denoted. Throughout this application, the "cloud point" means where there is a severe increase in light scattering which does not quickly level off.

In comparison, the term "haze point" as used in this specification and appended claims means the temperature at which light scattering begins, i.e., the onset, but then levels off shortly thereafter. Thus, from an operational perspective when practicing the process of the invention, the goal of the process would be to eliminate any increase in light scattering above the base line light scattering above a chosen temperature specification. For example, no increase in light scattering above 0° C. is a preferred embodiment of this process. The haze point is measured using a modified version of ASTM-D5773 "Standard Test Method for Cloud Point of Petroleum Products (Constant Cooling Rate Method)". The only modification was in reading the results as follows: the graphical results are reviewed and the first deviation from the base line light scattering is the haze point.

Without being limited by theory, it is believed material causing a "cloud" is normal paraffins coming out of solution and material causing "haze" is different compounds coming out of solution. The haze point is always higher than the cloud point. The difference between cloud and haze points is evident by comparing the cloud point and haze point in Table 1 below. The cloud points were much lower than the haze points.

TABLE 1[1]

| DWX Catalyst | RUN HOURS | DWX LHSV | C.A.T. | YIELD | POUR | CLOUD | VIS @ 100 | COMMENTS |
|---|---|---|---|---|---|---|---|---|
| Pt-ZSM-48 + EU-1 | 164 | 1.0 | 690 | 71 | −31 | NC | 27.3 | 20 × 100 MESH, HDF = ICR403 @450° F. |
| Pt-ZSM-48 + EU-1 | 196 | 1.0 | 670 | 81 | −25 | NC | 30.8 | 20 × 100 MESH, HDF = ICR403 @450° F. |
| Pt-ZSM-48 + EU-1 | 236 | 1.0 | 650 | 86 | −20 | 0 | 31.1 | 20 × 100 MESH, HDF = ICR403 @450° F. |
| Pt-ZSM-48 + EU-1 | 308 | 1.0 | 660 | 87 | −29 | NC | 31.3 | 20 × 100 MESH, HDF = ICR403 @450° F. |

[1]The feed was Bright Stock A.

VI. ILLUSTRATIVE EMBODIMENTS

The invention will be further clarified by the following examples, which are intended to be purely exemplary of the invention.

Illustrative Embodiment 1

Preparation of Zeolite ZSM-48:

Zeolite ZSM-48 was synthesized from a reactive get of composition $Al/Si:Na/Si:OH/Si:RNBr_2/Si:H_2O/Si = 0.0096:0.59:0.194:0.100:39.0$. Sodium silicate solution (2400 g) and deionized water (3800 g) were placed in an autoclave liner and stirred using an overhead anchor-type stirrer. A total of 1040 g of 2.4 M $H_2SO_4$ solution was added from a buret over 18 minutes. During the addition, a thick get formed, although the mixture was still able to stir. The mixture was stirred for an additional 15 minutes after addition was complete. A mixture of 1895 g deionized water, 410 g of 0.15 M aluminum sulfate, and 445 g solid hexamethonium bromide monohydrate was made and added to the reaction mixture from a buret over 32 minutes. The liner containing the reactive gel was placed in an autoclave, which was sealed and pressure tested. The reaction mixture was stirred at 75 rpm and the autoclave heated to 175° C. over 12 hours. The temperature was held at 175° C. for 24 hours. After cooling, the solid product was recovered by filtration, washed with deionized water, and dried at 120° C. XRD showed the oven-dried product to be ZSM-48 with no crystalline impurities. ZSM-48 product was calcined at 595° C., ammonium exchanged 4× with 0.5 M ammonium nitrate, washed with deionized water, dried at 120° C., and calcined again at 595° C. before use in catalytic experiments.

Illustrative Embodiment 2

Preparation of Zeolite EU-1:

Zeolite EU-1 was synthesized from a reactive gel of composition Al/Si:NaOH/Si:RNBr$_2$/Si:H$_2$O/Si= 0.048:0.319:0.279:48.0. Deionized water (1621 g) was weighed into an autoclave liner and 7.67 g of Reheis F2000 alumina added with stirring. Sodium hydroxide solution (50% w/w, 49.12 g) was added with stirring and stirred for an additional 15 minutes. Solid hexamethonium bromide monohydrate (204.0 g) was added and the mixture stirred for 10 minutes more. Finally, 123.2 g of Cabosil M5 silica were added and the reaction mixture stirred for an additional one hour. The liner containing the reactive gel was placed in an autoclave, which was sealed and pressure tested. The autoclave was heated to 190° C. over 15 hours and held at that temperature. Periodic sampling showed that crystallization was complete after about 2½ days at temperature. The autoclave was cooled and the solid product collected by filtration. The wet filter cake was washed first with dilute KOH solution and then with deionized water and finally dried at 120° C. XRD showed the solid product to be EU-1 (EUO phase) with no crystalline impurities. EU-1 was calcined in air at 595° C., ammonium exchanged 4× with 0.5 M ammonium nitrate, washed with deionized water, dried at 120° C., and calcined again at 595° C. before use in catalytic experiments.

Illustrative Embodiment 3

Preparation of Pd-Zeolite Hexadecane Hydrocracking Catalysts:

To make these catalysts, samples of ammonium-exchanged and re-calcined zeolites were exchanged with enough Pd(NH$_3$)$_4$$^{2+}$ (NO$_3$)$_2$ to give 0.5 wt % Pd on an anhydrous basis. A sample of the zeolite was weighed out and slurried in ca. 5 g deionized water per g zeolite. The slurry was neutralized to pH~10 with dilute NH$_4$OH solution. The required amount of Pd(NH$_3$)$_4$$^{2+}$ (NO$_3$)$_2$ was weighed out and dissolved in the minimum amount of water. This solution was added to the zeolite slurry and the resulting mixture stirred for two hours. The Pd-exchanged zeolite was recovered by filtration, washed with deionized water, dried at 120° C., and calcined at 483° C. in air. Prior to catalytic experiments, the samples of Pd-zeolite were pelletized in a Carver press and crushed to 20/40 mesh particle size.

Illustrative Embodiment 4

Hexadecane Hydrocracking Experiments:

Hexadecane hydrocracking experiments were carried out with 0.5 g Pd-zeolite catalyst in a downflow reactor in the vapor phase at temperatures from 260 to 371° C. Total pressure was 1200 psig with a hydrogen flow rate of 160 ml/min. Hexadecane feed rate was 1.0 ml/hr. Temperature was provided by a three-zone furnace. The catalyst was loaded into a ¼" OD tubing reactor so that it would be in the isothermal section of the furnace. After attaching the reactor tube and pressure testing, the reactor was heated to the desired temperature at atmospheric pressure under flowing hydrogen. Upon reaching the desired reaction temperature, the pressure was increased to 1200 psig and the hexadecane feed started. Hexadecane conversion and product selectivity was monitored by an on-line gc. To measure hydroisomerization selectivity, the reaction temperature was adjusted to give 96% total n-hexadecane conversion. The hydroisomerization selectivity is defined as:

$$\frac{\% \text{ iso C16 formed}}{\% \text{ n-C16 reacted}} \times 100.$$

Hexadecane hydroisomerization results are shown in the Table below. The results show that ZSM-48 has a high selectivity to hydroisomerization, but EU-1 has a very low selectivity for hydroisomerization. Most of the conversion by EU-1 was hydrocracking to lighter products. The results are shown in Table 2 below.

TABLE 2

| Catalyst | Temperature, ° C. | hydroisomerization selectivity, % |
|---|---|---|
| Pd-ZSM-48 | 292 | 72 |
| Pd-EU-1 | 298 | 5 |

Illustrative Embodiment 5

Pilot Plant Runs:

Catalysts were sieved, pelletized and sized to 10/18 mesh, Interstitial vol filled with 100 mesh alundum (120–155 wt. %): 0.6 LHSV, 2300 Total Pressure, 4000 SCF/bbl once-through hydrogen. Run Conditions for Bright Stock "A" feed were as follows: 1.0 LHSV, 2300 Total Pressure, 5000 SCF/bbl once-through hydrogen.

The superior results obtained from ZSM-48 in combination with Zeolite EU-1 versus ZSM-48 alone are shown by comparing Table 3 and Table 4. For Table 3, the following applies: Product Summary for Bright Stock C Haze Reduction. Catalyst System: IDW R1: Pt ZSM-48; IDW R2: Blend of Pt ZSM-48 (80%)+Pt EU-1 (20%). Sieve pelletized and sized to 10/18 mesh, Interstitial vol filled with 100 mesh alundum (120–155 wt. %). Equal sieve volumes for IDW R1 & R2 catalysts.

For Table 4, the following applies: Pt ZSM-48 alone—pelletized and sized to 24–42 mesh—no interstitial beads.

Table 5 shows the results obtained from using SSZ-32 in combination with Zeolite EU-1.

TABLE 3

ZSM-48 + EU-1

| Feed | Run Hr | LHSV Overall | R1 Temp | R2 Temp | Pour | Haze | Vis @ 100 | Yield 700+ |
|---|---|---|---|---|---|---|---|---|
| Bright Stock "C" | 71 | 0.6 | 650 | 640 | −31 | 16 | 21.41 | 71.6 |
| | 114 | | 660 | 630 | −32 | 17 | 21.37 | 69.2 |
| | 138 | | 660 | 620 | −32 | 16 | 21.45 | 71.1 |
| | 162 | | 660 | 650 | −33 | 12 | 21.19 | 65.4 |
| | 187 | | 650 | 650 | −34 | 11 | 21.4 | 66.2 |
| | 210 | | 650 | 670 | −33 | NC | 20.23 | 59.9 |
| | 282 | | 640 | 660 | −33 | 6 | 20.7 | 62.9 |
| | 306 | | 600 | 660 | −34 | 10 | 20.44 | 63.3 |
| | 330 | | 600 | 670 | −40 | −1 | 19.57 | 56.6 |
| | 410 | 0.31 | 600 | 650 | −33 | −3 | 20.52 | 57.1 |
| | 459 | 0.3 | 600 | 640 | −35 | −2 | 21.02 | 63.7 |
| | 498 | 0.6 | 400 | 670 | −35 | −4 | 19.7 | 59.0 |
| | 534 | | 650 | 670 | −39 | 1 | 19.83 | 59.2 |
| | 564 | | 680 | 670 | −34 | 2 | 19.17 | 54.5 |
| | 602 | | 680 | 650 | −36 | 3 | 19.78 | 59.0 |
| | 639 | | 680 | 640 | −40 | 6 | 19.58 | 61.2 |

TABLE 3-continued

ZSM-48 + EU-1

| Feed | Run Hr | LHSV Overall | R1 Temp | R2 Temp | Pour | Haze | Vis @ 100 | Yield 700+ |
|---|---|---|---|---|---|---|---|---|
| | 662 | 690 | 650 | −35 | NC | 18.46 | 52.1 | |
| | 694 | 690 | 680 | −35 | NC | 17.14 | 42.8 | |
| | 786 | 690 | 650 | −36 | NC | 17.98 | 46.6 | |
| | 835 | 670 | 670 | −34 | NC | 17.49 | 47.1 | |
| | 864 | 660 | 670 | −36 | NC | 17.81 | | |
| | 897 | 650 | 670 | −39 | NC | 17.68 | | |

Note: column alignment—values above are for Run Hr, R1 Temp, R2 Temp, Pour, Haze, Vis @ 100, Yield 700+.

TABLE 4

ZSM-48

| Feed | Run Hr | LHSV | Reactor Temp | Pour | Haze | Vis @ 100 | Yield |
|---|---|---|---|---|---|---|---|
| BRIGHT STOCK "C" | 118 | 0.95 | 700 | −32 | 20 | 19.29 | 67.9 |
| | 238 | | 685 | −22 | 20 | 20.31 | 72.0 |
| | 262 | | 680 | −16 | 20 | 20.31 | 74.2 |
| | 291 | | 675 | −6 | 22 | 20.4 | 76.1 |

TABLE 5

SSZ-32 + EU-1
Catalyst System: IDW R1: Pt SZ-32; IDW R2: Blend of Pt SZ-32 (80%) + Pt EU-1 (20%)

| Feed | Run Hr | Temp R1/R2 | Pour Point | Haze Pt | Vis @ 100 |
|---|---|---|---|---|---|
| BRIGHT STOCK "C" | 41 | 680/680 | −22 | 23 | 20.63 |
| | 65 | 690/690 | −28 | 21 | 20.19 |
| | 89 | 700/700 | −29 | 19 | 19.53 |
| | 161 | 700/700 | −34 | 14 | 18.38 |
| | 185 | 710/710 | −38 | 12 | 16.98 |
| | 209 | 720/720 | −39 | 10 | 15.69 |
| | 234 | 680/720 | −42 | 10 | 15.97 |
| | 329 | 600/735 | −48 | * | 10.19 |
| | 377 | 600/730 | −47 | * | 10.01 |
| | 402 | 600/720 | −44 | −2 | 12.51 |
| | 425 | 600/720 | −45 | 0 | 12.81 |
| | 497 | 710/710 | −42 | 10 | 15.64 |

What is claimed is:

1. A process for reducing the haze point of a hydrocarbon feed comprising contacting a hydrocarbon oil feedstock, which has a major portion boiling over 1000° F., with a catalyst system comprising Zeolite EU-1 and a catalyst selected from the group consisting of SSZ-32, ZSM-48, and mixtures thereof, wherein at least a portion of said feedstock is converted.

2. The process of claim 1 wherein said catalyst system consists essentially of ZSM-48 and Zeolite EU-1.

3. The process of claim 1 wherein said catalyst system consists essentially of SSZ-32 and Zeolite EU-1.

4. The process of claim 1 wherein said catalyst system further comprises an amorphous catalyst.

5. The process of claim 1 wherein said catalyst system further comprises a hydrogenation component.

6. The process of claim 1 wherein the haze point of said hydrocarbon feedstock is reduced to not more than 15° C.

7. The process of claim 1 wherein the haze point of said hydrocarbon feedstock is reduced to not more than 10° C.

8. The process of claim 1 wherein the haze point of said hydrocarbon feedstock is reduced to not more than 5° C.

9. The process of claim 1 wherein the haze point of said hydrocarbon feedstock is reduced to not higher than 0° C.

10. The process of claim 5 wherein said hydrogenation component comprises a Group VIII metal.

11. The process of claim 10 herein said hydrogenation component is selected from platinum, palladium, and mixtures thereof.

12. The process of claim 1 wherein said process is a dewaxing process and wherein said contacting is under dewaxing conditions.

13. The process of claim 12 wherein said contacting is carried out at a temperature of from about 200° C. to 475° C., a pressure of from about 15 psig to about 3000 psig, a liquid hourly space velocity of from about 0.1 hr$^{-1}$ to about 20 hr$^{-1}$, and a hydrogen to feed ratio of from 500 to about 30,000 SCF/bbl.

14. The process of claim 13 wherein said hydrocarbon oil feedstock contains less than 50 ppmw organic nitrogen.

15. The process of claim 14 wherein said hydrocarbon oil feedstock contains less than 10 ppmw organic nitrogen.

16. The process of claim 1 wherein said hydrocarbon oil feedstock is bright stock.

17. The process of claim 1 wherein said hydrocarbon oil feedstock comprises a bright stock and wherein the process is a process for isomerization dewaxing said bright stock comprising contacting said bright stock in the presence of added hydrogen under isomerization dewaxing conditions with the catalyst.

18. The process of claim 1 wherein said hydrocarbon oil feedstock comprises a bright stock and wherein the process is a process for improving the viscosity index of a dewaxed product of said bright stock comprising contacting the catalyst system with said bright stock under isomerization dewaxing conditions.

19. The process of claim 1 wherein the process is a process for preparing a lubricating oil:
   (a) wherein said hydrocarbon oil feedstock is the effluent of hydrocracking in a hydrocracking zone a hydrocarbonaceous feedstock to obtain an effluent comprising a hydrocracked oil; and
   (b) wherein said contacting step comprises catalytically dewaxing said effluent at a temperature of at least about 400° F. and at a pressure of from about 15 psig to about 3000 psig in the presence of added hydrogen gas with the catalyst.

20. A process for reducing the haze point of a bright stock comprising contacting, under dewaxing conditions, a bright stock feedstock in the presence of added hydrogen gas with a catalyst system comprising ZSM-48 and Zeolite EU-1, and a hydrogenation component, wherein said hydrogenation component is present in an amount of from about 0.01% to about 10% based on the weight of said catalyst, wherein the haze point of said bright stock is reduced to not more than 0° C.

21. The process of claim 20 wherein said catalyst system consists essentially of ZSM-48 and Zeolite EU-1.

22. The process of claim 20 wherein said catalyst system further comprises a Group VIII metal hydrogenation component.

23. The process of claim 20 wherein said process is a dewaxing process and wherein said contacting is under dewaxing conditions.

24. The process of claim 23 wherein said contacting is carried out at a temperature of from about 200° C. to 475° C., a pressure of from about 15 psig to about 3000 psig, a liquid hourly space velocity of from about 0.1 $hr^{-1}$ to about 20 $hr^{-1}$, and a hydrogen to feed ratio of from 500 to about 30,000 SCF/bbl.

25. The process of claim 24 wherein said hydrocarbon oil feedstock contains less than 50 ppmw organic nitrogen.

26. The process of claim 20 wherein the haze point of said bright stock is reduced to not more than 10° C. greater than the pour point of said bright stock.

27. The process of claim 20 wherein the haze point of said bright stock is reduced to not higher than 10° C.

28. The process of claim 20 wherein the haze point of said bright stock is reduced to at least 5° C.

29. The process of claim 20 wherein the haze point of said bright stock is reduced to at least 0° C.

30. A process for dewaxing a bright stock comprising contacting, at a temperature of from about 200° C. to 475° C., a pressure of from about 15 psig to about 3000 psig, a liquid hourly space velocity of from about 0.1 $hr^{-1}$ to about 20 $hr^{-1}$, and a hydrogen to feed ratio of from 500 to about 30,000 SCF/bbl., a bright stock oil feedstock containing less than 50 ppmw organic nitrogen, in the presence of added hydrogen gas, with a catalyst system comprising Zeolite EU-1 and a catalyst selected from the group consisting of ZSM-48, SSZ-32, and mixtures thereof, wherein at least a portion of said feedstock is dewaxed, and wherein the haze point of said bright stock is reduced to not more than 10° C.

31. The process of claim 30 wherein said catalyst system consists essentially of ZSM-48 and Zeolite EU-1.

32. The process of claim 30 wherein said catalyst system consists essentially of SSZ-32 and Zeolite EU-1.

33. The process of claim 30 wherein the haze point of said bright stock is reduced to not more than 5° C.

34. The process of claim 33 wherein the haze point of said bright stock is reduced to not more than 0° C.

* * * * *